3,809,653
INHIBITION OF CORROSIVE ACTION OF FIRE RETARDANTS CONTAINING AQUEOUS AMMONIATED SUPERPHOSPHORIC ACID ON ALUMINUM
James Earl Sansing, Chester, and Joseph Novotny, Hopewell, Va., assignors to Allied Chemical Corporation, Morristown, N.J.
No Drawing. Filed Oct. 13, 1972, Ser. No. 297,528
Int. Cl. C23g 1/06
U.S. Cl. 252—148        3 Claims

ABSTRACT OF THE DISCLOSURE

Aluminum metal corrosion by an aqueous solution of ammoniated superphosphoric acid is inhibited by incorporating therein effective amounts of (a) urea plus (b) a water soluble 2-mercaptobenzothiazole compound. The aqueous solution, which is useful as a liquid fire retardant, has a pH of 5–8, a nitrogen content of 9–12%, by weight and a total phosphorus content measured as $P_2O_5$ of 28–39% by weight.

BACKGROUND OF THE INVENTION

This invention relates to fire retardants containing aqueous ammoniated superphosphoric acid solutions; in particular, it relates to the inhibition of the corrosive action thereof on aluminum metal.

Various ammonium phosphate compounds have been used for some time in fire retardant compositions, e.g., in compositions used in forest fire fighting. Since ammonium phosphates are also utilized as fertilizer materials, their use in forest fires provides a residual benefit to the soil. Airplanes and aerial methods are preferably used for fire retardant applications of ammonium phosphate compositions, and it is essential that aluminum metal in such equipment be protected against corrosion. Thus, there has been a continuing interest in finding effective corrosion inhibitors. In addition to being noncorrosive, it is desirable for the fire retardant composition to be in a liquid form, such as an aqueous solution, so that it has the inherent advantageous properties of a liquid including ease of measuring, transferring, mixing and application. Low cost is another important factor.

It has been found that aqueous ammoniated superphosphoric acid derived from low-cost wet-process phosphoric acid can be used as a fire retardant composition. Such material contains polyphosphates which solubilize the trace minerals in the wet-process acid. The ammoniated superphosphoric acid is readily prepared by evaporating wet-process phosphoric acid at high temperatures to form superphosphoric acid containing pyrophosphoric acid, which is then diluted with water and ammoniated.

Unfortunately, it has been found that aqueous ammoniated superphosphoric acid is very corrosive to aluminum metals. Therefore, the use of the solutions has presented the problem of preventing undue corrosion of the aluminum equipment which is already in use for handling other liquid fire retardant materials.

Heretofore, the problem of corrosive action on aluminum equipment in which ammoniated superphosphoric acid solutions are handled has been met by incorporating certain corrosion inhibitors. Ammonium fluoride and ammonium chromate are fairly good inhibitors, but do not meet government requirements with respect to corrosion of aluminum. Moreover, heavy metal radicals such as chromate contribute to water pollution and are otherwise ecologically harmful. Ideally, a corrosion inhibitor should reduce corrosion of aluminum to a corrosion level of 0.001 inch per year or less; it should be in water-soluble form for easy mixing with the aqueous fire retardant solution; and it should not cause environmental problems upon use. Inhibitors used heretofore did not have these and other requirements which are satisfied by the inhibitor of this invention.

SUMMARY OF THE INVENTION

An object of this invention is to provide an aqueous ammoniated superphosphoric acid solution containing a corrosion inhibitor for protection of aluminum, which inhibitor is not detrimental to environmental quality.

Another object of the present invention is to provide a nitrogen and phosphorus-containing fire retardant composition at about neutral pH in liquid form which is relatively stable during storage.

A further object of the invention is to provide a liquid fire retardant concentrate which when added to water produces a fire retardant for use in prevention or control of forest fires, said liquid concentrate being pumpable using conventional field pumping equipment.

It has now been found that these and other objects are obtained by incorporating in an aqueous ammoniated superphosphoric acid at least about 0.4 part by weight of urea and at least about 0.02 part by weight of a water-soluble 2-mercaptobenzothiazole compound, based on the total phosphorus content measured as $P_2O_5$, said aqueous ammoniated superphosphoric acid being only partially ammoniated to a pH of from about 5 to 8.

The aqueous ammoniated superphosphoric acid is normally obtained by evaporating wet-process phophoric acid to form superphosphoric acid, which is then diluted with water and ammoniated to pH 5–8. The urea and the 2-mercaptobenzothiazole compound are incorporated in the aqueous ammoniated superphosphoric acid by simple mixing, since they are both soluble in the aqueous solution.

The term "2-mercaptobenzothiazole compound" is intended to include the compound 2-mercaptobenzothiazole itself as well as all of the salts thereof that are soluble in aqueous ammoniated superspheric acid solution having a nitrogen content of 9–12% by weight and a total phosphorus content measured as $P_2O_5$, of 28–39% by weight. Thus, this term encompasses alkali metal salts (such as sodium, potassium), soluble amine salts (such as methylamine), and many other salts.

With respect to use of the fire retardant composition of this invention for control of forest fires, it is important that the urea and 2-mercaptobenzothiazole corrosion inhibitors contained therein are organic compounds that readily undergo decomposition in natural environments. In view of prior use of highly toxic heavy metal inhibitors such as chromate, the present improvement is particularly important. In this regard, we point out that the National Environmental Policy Act declares that it is a continuing policy of the Federal Government to use all practicable means and measures to foster and promote the general welfare, create and maintain conditions under which man and nature can exist in productive harmony, and fulfill the social, economic, and other requirements of present and future generations of Americans.

DESCRIPTION OF THE PREFERRED EMBODIMENT

One preferred embodiment of the invention is a liquid concentrate which when added to water produces a fire retardant for use in prevention or control of forest fires. The liquid concentrate is intended to be pumped using conventional field pumping equipment. The fire retardant is normally diluted and applied to the forest fuels by means of aircraft or ground apparatus; it adheres to the fuel and, when heated, acts to slow or stop combustion. The corrosiveness of the concentrated fire retardant toward aluminum metal is generally no more than 1 mil per year; it is even less corrosive upon dilution with water.

In accordance with the invention, the preferred liquid forest fire retardant concentrate in the form of a flowable thickened liquid comprises:

(a) An aqueous ammoniated superphosphoric acid solution having a pH of about 5 to 8, preferably about 6;

(b) A colloidal attapulgite clay dispersed in said aqueous ammoniated superphosphoric acid solution in amount that is sufficient to cause the solution to adhere to a forest fuel and is insufficient to cause said solution to become unpourable;

(c) About 0.4 to 1.4 parts by weight, based on the total phosphorus content measured as $P_2O_5$, of urea dissolved in said ammoniated superphosphoric acid solution; and (d) About 0.02 to 0.2 part by weight, based on the total phosphorus content measured as $P_2O_5$, of an alkali metal salt of 2-mercaptobenzothiazole dissolved in said ammoniated superphosphoric acid solution.

Desirably, the fire retardant composition contains a small quantity of coloring material, e.g., 0.5 to 5% red iron oxide, so that when the fire retardant is applied to a forest fire from an airplane, the area covered is easily visible. Powdered red iron oxide is readily dispersed in the fire retardant composition and it is maintained in solution by the colloidal attapulgite clay. Thickening agents such as carboxymethyl cellulose may be added to the composition in small amounts if desired.

The preferred aqueous ammoniated superphosphoric acid of this invention has a pH of from about 5 to 8, preferably about 6; a nitrogen content of from about 9% to 12% by weight, preferably from about 10% to 11% by weight; a total phosphorus content measured as $P_2O_5$ of from about 28% to 39% by weight, preferably about 34% to 38% by weight, and wherein polymeric phosphates represent from about 30% to 70% by weight, preferably from about 55% to 65% by weight, based on the weight of the total phosphorus content. The solution normally contains about 1–5% trace minerals derived from wet-process phosphoric acid, the preferred source of $P_2O_5$. The polymeric phosphates include pyrophosphates and other polyphosphates.

A commercially available aqueous ammoniated superphosphoric acid derived from wet-process phosphoric acid and having the following properties which will hereinafter be referred to as "Solution A," has been found to be useful for purposes of the present invention:

| | |
|---|---|
| Nitrogen _____percent by weight__ | 10 |
| Phosphorus [1] (as $P_2O_5$) _____do____ | 34 |
| Trace minerals _____do____ | 1 to 2 |
| Iron ($Fe_2O_3$) _____do____ | Ca. 1.0 |
| Calcium (CaO) _____do____ | Ca. 0.1 |
| Magnesium (MgO) _____do____ | Ca. 0.3 |
| pH _____ | 6.0 |
| Specific gravity at 60° F. _____ | 1.4 |
| Salting out temperature _____° F__ | 0 |

[1] Distribution as percent by weight of the ammonium phosphates present was about: 37% ammonium orthophosphate; 49% ammonium pyrophosphate; 8% ammonium tripolyphosphate; 5% ammonium tetrapolyphosphate; 1% higher ammonium phosphates.

Solution A is stable for many weeks with or addition of the instant corrosion inhibitors.

The clay we prefer to use in carrying out this invention is a colloidal grade of clay containing a predominant amount of the clay mineral attapulgite. By "colloidal" clay, we refer to a clay which is capable of being dispersed in water to its ultimate colloidally dimensioned particles. This property is possessed by raw attapulgite clay as mined and the colloidal properties are maintained until the clay is dried to a volatile matter content of about 10%. Thus, we employ attapulgite clay which has never been dried to a volatile matter content less than about 10%, preferably one which has never been dried to a volatile matter content less than 20%. Sepiolite clay may also be used when it is available.

Unlike most clays, such as bentonite clay and kaolin clay, which are composed of layered minerals, attapulgite and sepiolite clays are composed of ultimate colloidally dimensioned needle-like particles. Bentonite clays and kaolin clays are not as useful in carrying out our invention as is attapulgite clay. The use of bentonite clays necessitates a dilution which in many instances is highly undesirable.

With respect to the 2-mercaptobenzothiazole compounds that may be utilized as inhibitor in this invention, the most commonly available are the corresponding sodium and potassium salts. It appears that the combination of urea and 2-mercaptobenzothiazole compound provides a synergistic effect with respect to corrosion inhibition.

The urea and 2-mercaptobenzothiazole compounds are added to the aqueous ammoniated superphosphoric acid solution in amounts to provide an effective corrosion-inhibiting level in the solution. A urea level of at least about 0.4 part, preferably 0.4 to 1.4 parts by weight and a 2-mercaptobenzothiazole level of at least 0.02 part, preferably 0.02 to 0.2 part by weight, based on the $P_2O_5$ content, are normally used although lower levels may be employed if less effective inhibition is acceptable.

The preferred weight ratio of urea to 2-mercaptobenzothiazole compound is at least 8, preferably 10 to 20. Superior corrosion inhibition has been observed with use of about 15–18 parts of urea and about 1 part of 2-mercaptobenzothiazole compound in 70–100 parts of Solution A. Corrosion inhibition appears to be improved by dilution of the concentrated fire retardant composition with water.

It has been found that the pH of the aqueous partially ammoniated superphosphoric acid is critical. That is, a pH lower than 5 results in greatly increased rates of corrosion of both aluminum and ferrous metals even in the presence of inhibitor; a pH of about 6 is preferred. On the other hand, a pH greater than 8 results in increased corrosion rates of ferrous metals. Moreover, a pH greater than 8 adversely affects the stability of the solutions in that trace minerals tend to precipitate.

The corrosion inhibitor of the present invention in the specified ammoniated superphosphoric acid solutions protects against corrosion both pure aluminum and certain aluminum alloys. In fact, all metals commonly used in equipment for handling liquid fire retardant compositions are protected against corrosion by this invention, including carbon steels, substantially pure aluminum (over 99%) and aluminum containing up to about 5% of alloying elements, principally silicon, manganese, magnesium, or chromium, or combinations of these, and the aluminum alloys with a copper content not above about 5%.

The following examples are illustrative of the invention. In these examples the amounts of materials given in parts of percentages are by weight. The aqueous ammoniated superphosphoric acid solution used is Solution A described hereinabove.

EXAMPLE I

A fire retardant concentrate was prepared having the following composition:

| | Parts by weight |
|---|---|
| Solution A | 74.2 |
| Attapulgite clay | 4.0 |
| Red iron oxide ($Fe_2O_3$) | 1.5 |
| Urea | 16.8 |
| NaMBT [1] (50% aqueous solution) | 2.0 |
| Carboxymethyl cellulose | 1.5 |
| | 100.0 |

[1] For the sake of convenience, NaMBT is hereinafter used as the abbreviation for the sodium salt of 2-mercaptobenzothiazole. The fire retardant concentrate was prepared as follows:

First, about half of the above-listed amount of aqueous ammoniated superphosphoric acid (Solution A) at room temperature was thickened with a colloidal grade of powdered attapulgite clay from a deposit near Attapulgus, Ga. The volatile matter content of the clay was about 20%. The powdered clay was sifted into the Solution A while the solution was mixed at low speed in a conventional blender. After the addition of the clay was completed, the mixture was agitated at high speed (high shear rate) for 12 minutes in the blender. Next, the remainder of the Solution A was added and mixed in, followed by the urea, iron oxide, NaMBT, and carboxymethyl cellulose. The fluid was then mixed for 5 more minutes to insure dispersion of the solids. The viscosity of the resulting fire retardant concentrate was 880 centipoises.

The concentrated fire retardant composition showed satisfactory pourability after one week of storage. Moreover, suspendability of insoluble solids was excellent in that no clear supernatant liquid was evident after storage. This concentrate is considered satisfactory for shipping.

The concentrated fire retardant composition was then diluted with water using a ratio of about 3 volumes of water to 1 volume of concentrate, and the corrosion rate on pure aluminum and aluminum alloy 2024-T3 was determined. The final composition of the fluid, the corrosion rate and other pertinent data are tabulated below:

| Composition: | Weight percent |
|---|---|
| Solution A | 23.6 |
| Attapulgite clay | 1.3 |
| Urea | 5.4 |
| Red iron oxide ($Fe_2O_3$) | 0.5 |
| NaMBT (as 50% aqueous solution) | 0.6 |
| Carboxymethyl cellulose | 0.5 |
| Water | 68.1 |
| | 100.0 |
| pH | 6.5 |
| Viscosity, cps. | 120.0 |
| Aluminum corrosion, m.p.y. | 0.1 |

Urea and NaMBT are the particularly preferred inhibitors because they are commercially available and do not contain any heavy metals which contribute to water pollution.

EXAMPLE II

The following example is directed to techniques for use of the fire retardant composition of the present invention. The fire retardant concentrate is normally diluted with 2-3 parts of water prior to use by the dilute composition of Example I is generally used as prepared.

One of the most successful techniques used in aerial fire fighting is the building of a firebreak line ahead of the advancing forest fire. The liquid fire retardant is pumped from airplanes, i.e., aerial tankers, as they pass at relatively low speeds and low altitude over this line. The fire line is strengthened and lengthened depending upon the progress of the fire. Coloring agents, e.g., $Fe_2O_3$, are preferably used in the fire retardant to allow the airplane operator to see where he is applying the material. The fire fighting fluid may also be applied to the firebreak line by spraying from a vehicle operating on the ground or from a helicopter over the firebreak. When a large area must be covered, and where a large fire is already burning, the aerial tanker usually is a converted bomber which is the most effective device for delivery.

The fire fighting fluid can also be used to put out existing fires by delivery directly onto the burning material. This is also done by pumping from an aerial tanker. The fire retardant extinguishes the fire by endothermic reactions of the phosphate chemical, and by mechanically covering the burning fuel.

If there is relatively little forest canopy over the area to be treated, 1,000 gallons of fluid will normally put out the fire in an area of about 15,000 square feet. Less material is needed for treating a firebreak line. Where a heavily forested area is burning vigorously, somewhat higher amounts may be needed. A light spray of the fire retardant may be applied to forest areas during particularly dry periods when the hazard of fires is higher; such application gives some residual fire resistance to the forest area and also serves as a fertilizer.

A rather coarse spray of the clay-thickened fire retardant is normally used when applying from aircraft. The fire retardant may be also dispersed as a foam to increase coverage of the material.

We claim:

1. As a new composition of matter of low corrosiveness toward aluminum metal, a solution of ammoniated superphosphoric acid in water having a pH from about 5 to 8 and containing from about 9 percent to 12 percent by weight nitrogen, from about 28 percent to 39 percent by weight total phosphorus content measured as $P_2O_5$, and wherein polymeric phosphates represent from about 30 percent to 70 percent by weight based on the total phorphorus content, at least about 0.4 part by weight of urea and at least about 0.02 part by weight of a water-soluble 2-mercaptobenzothiazole compound, based on the total phosphorus content measured as $P_2O_5$.

2. The composition as claimed in claim 1 wherein the ammoniated superphosphoric acid solution is derived from wet-process phosphoric acid and contains at least about 1 percent to 5 percent trace minerals derived from the wet-process phosphoric acid.

3. The composition as claimed in claim 1 wherein the solution of ammoniated superphosphoric acid in water has a pH of about 6, a nitrogen content of from about 10 percent to 11 percent by weight, a total phosphorus content measured as $P_2O_5$ of from about 34 percent to 38 percent by weight, and wherein the polymeric phosphates represent about 55 percent to 65 percent by weight based on the total phosphorus content.

References Cited

UNITED STATES PATENTS

| | | | |
|---|---|---|---|
| 3,634,270 | 1/1972 | Engle | 252—149 |
| 3,335,085 | 8/1967 | Hronas | 252—150 X |
| 3,009,849 | 11/1961 | Bellinger | 252—148 X |
| 3,076,701 | 2/1963 | Bersworth | 252—148 X |

MAYER WEINBLATT, Primary Examiner

U.S. Cl. X.R.

21—2.7A; 252—149, 150, 151, 389A, 8.1.